(12) United States Patent
Vinokurov et al.

(10) Patent No.: US 10,563,807 B2
(45) Date of Patent: Feb. 18, 2020

(54) COMPOSITE CONICAL SLEEVE

(71) Applicants: Valeriy Ivanovich Vinokurov, Moscow (RU); Valeriy Vladimirovich Yudin, Moscow (RU); Roman Radifovich Muginov, Moscow (RU)

(72) Inventors: Valeriy Ivanovich Vinokurov, Moscow (RU); Valeriy Vladimirovich Yudin, Moscow (RU); Roman Radifovich Muginov, Moscow (RU)

( * ) Notice: Subject to any disclaimer, the term of this patent is extended or adjusted under 35 U.S.C. 154(b) by 0 days.

(21) Appl. No.: 16/074,432

(22) PCT Filed: Dec. 4, 2017

(86) PCT No.: PCT/IB2017/057607
§ 371 (c)(1),
(2) Date: Aug. 1, 2018

(87) PCT Pub. No.: WO2018/134657
PCT Pub. Date: Jul. 26, 2018

(65) Prior Publication Data
US 2019/0040989 A1    Feb. 7, 2019

(30) Foreign Application Priority Data
Jan. 20, 2017   (RU) .................................. 2017101774

(51) Int. Cl.
*F16L 55/17*   (2006.01)
*F16L 55/175*  (2006.01)
*F16L 58/18*   (2006.01)

(52) U.S. Cl.
CPC .......... *F16L 55/1705* (2013.01); *F16L 55/17* (2013.01); *F16L 55/1715* (2013.01); *F16L 55/175* (2013.01); *F16L 58/181* (2013.01)

(58) Field of Classification Search
CPC ....... F16L 55/16; F16L 55/168; F16L 55/174; F16L 55/02
USPC ...................................... 138/99, 97
See application file for complete search history.

(56) References Cited

U.S. PATENT DOCUMENTS

| | | | | |
|---|---|---|---|---|
| 2,924,546 A | * | 2/1960 | Shaw | F16L 55/1686 156/94 |
| 4,559,974 A | * | 12/1985 | Fawley | B29C 53/66 138/172 |
| 7,938,146 B2 | * | 5/2011 | Brooks | F16L 55/1683 138/97 |
| 9,016,324 B2 | * | 4/2015 | Niccolls | B32B 1/08 138/140 |

(Continued)

FOREIGN PATENT DOCUMENTS

| | | |
|---|---|---|
| GB | 2210134 A | 6/1989 |
| RU | 2191317 C2 | 10/2002 |

(Continued)

*Primary Examiner* — Patrick F Brinson

(57) ABSTRACT

A device for repairing pipelines comprises a sleeve adhered to a pipeline, said sleeve being made of a cured composite material in the form of a truncated cone with a cylindrical passage passing along an axis, the diameter of the passage being equal to the outer diameter of the pipeline being repaired, and a side wall, the inner surface of the side wall corresponding to the outer surface of the sleeve, wherein the side wall is made of a cured composite material. The invention provides improvement of performance reliability of the repaired pipeline.

5 Claims, 2 Drawing Sheets

(56) References Cited

U.S. PATENT DOCUMENTS

2014/0048164 A1 2/2014 Souza
2016/0363250 A1* 12/2016 Biel ........................ F16L 57/02

FOREIGN PATENT DOCUMENTS

| RU | 2219423 | C2 | 12/2003 |
| RU | 2224169 | C2 | 2/2004 |
| RU | 2378560 | C1 | 1/2010 |
| RU | 113811 | U1 | 2/2012 |
| RU | 129593 | U1 | 6/2013 |
| RU | 148064 | U1 | 11/2014 |
| SK | 1995 | A3 | 6/1996 |

* cited by examiner

[Fig. 1]
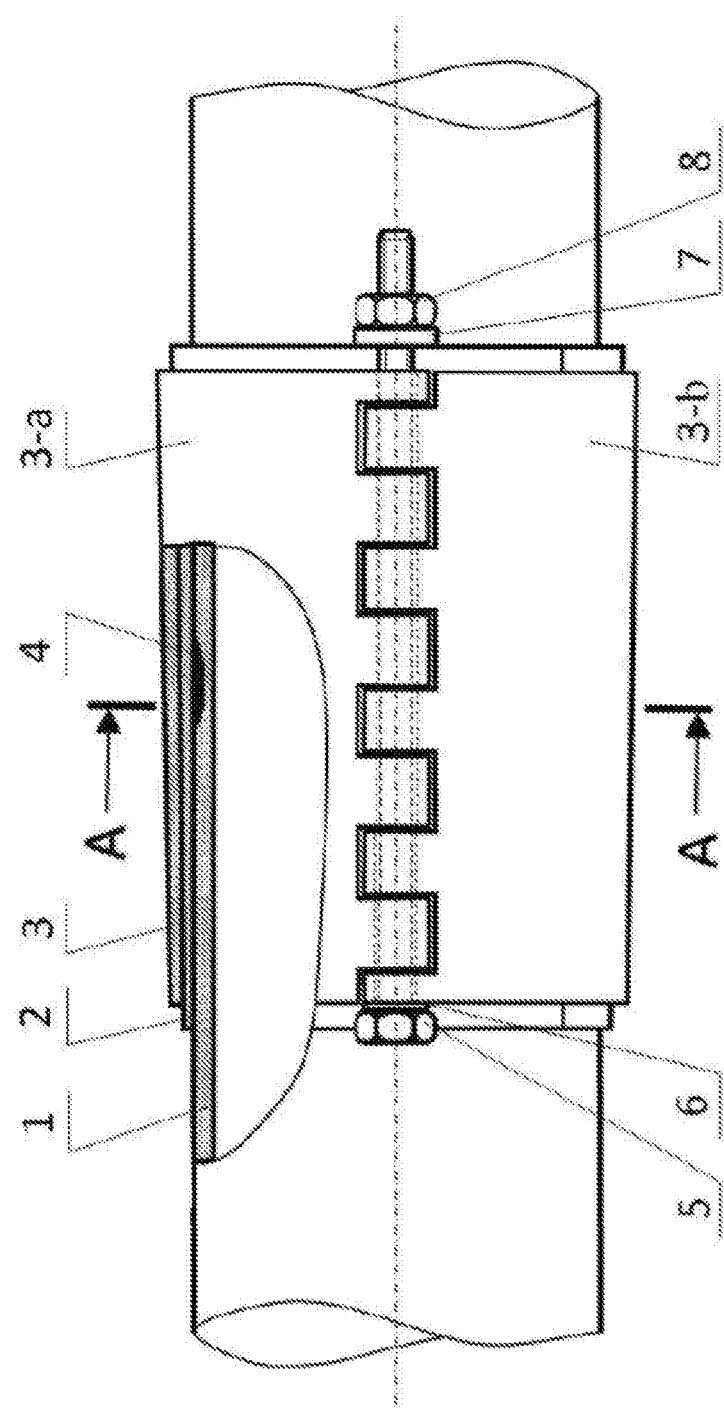

[Fig. 2]
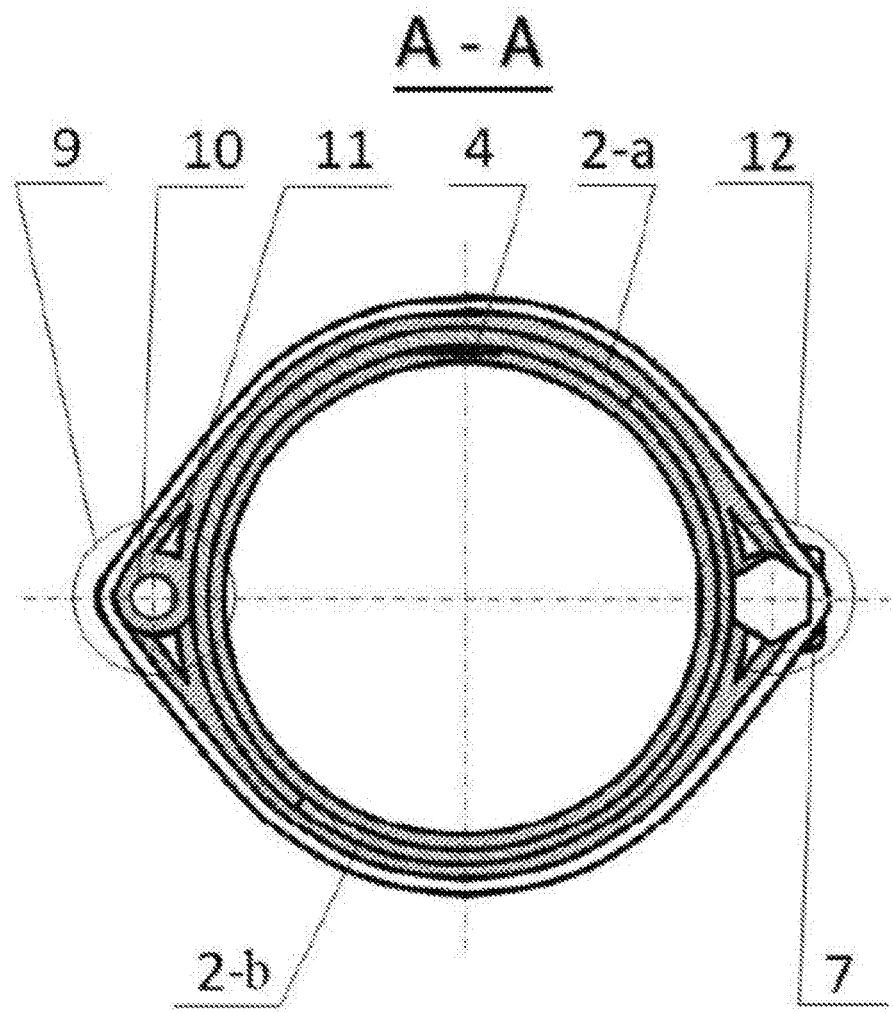

COMPOSITE CONICAL SLEEVE

TECHNICAL FIELD

The present invention relates to devices for repairing pipelines, in particular, for repairing defective areas and welded joint defects of pipelines without stopping pipage (of water, oil, natural gas and other liquids and gases), as well as for reinforcing welded joints at the stage of pipeline construction.

BACKGROUND ART

Different devices are used for repairing pipelines including those having a side wall consisting of two parts connected to each other and mounted around the pipeline defective area with a gap between the inner surface of the side wall and the outer surface of a pipe, which is filled with an uncured composite material (RU 113811 U1, Feb. 27, 2012, RU 129593 U1, Jun. 27, 2013, RU 2191317 C2, Oct. 20, 2002, RU 2378560 C1, Jan. 10, 2010, SK 1995 A3, Nov. 6, 1996, GB 2210134 A, Jun. 1, 1989). This method of repairing is referred to as "Composite sleeve technology", CST for short.

CST has a variety of disadvantages, the main of which are:

1) a risk of non-uniform filling the space between a pipe and the side wall with the composite material, which does not provide guaranteed quality of repair, due to the air bubbles which can be formed during injection of a liquid composite material, particularly over the defect, which subsequently can cause pressing out metal into the cavity appeared and unsealing the pipeline;

2) the complexity of conducting arc welding of the outer metal side wall halves under the water, which constrains application of the given method for repairing underwater pipelines;

3) the necessity for providing active protection of the metal side wall against soil corrosion;

4) while having relatively low cost of materials and components of the repair structure, the high cost of organizational and technical measures for its installation, making repair in whole expansive.

A polymeric sleeve for repairing pipes with localized corrosion defects, lacking those disadvantages, consists of several layers of glass tape connected to each other by means of an adhesive layer and covers the pipeline circumferentially, wherein the sleeve is made of two separate preformed halves provided with hinged units engaged into each other at the ends and concatenated by means of the coupling shafts oriented in parallel in relation to the pipeline axis (RU 2219423 C2, Dec. 20, 2003). However, this repair structure has the other drastic disadvantages. Thus, due to the absence of the metal side wall this sleeve does not allow for bringing area being repaired to a defect free extent, since pretension, which is provided initially by heating the fiberglass sleeve and then by shrinkage thereof due to cooling down, is insufficient for fiberglass strength development to stop progression of the defect under the sleeve up to through hole. The reason for this is that the modulus of elasticity of fiberglass is at least seven times lower than the modulus of elasticity of steel. Furthermore, heating of a bulk fiberglass structure up to a temperature of about 160° C. is rather difficult in the field environment.

According to RU2224169 C2, Feb. 20, 2004, a sleeve for repairing a pipeline is known, wherein the sleeve comprises a tape, made of the preformed composite material in the form of two halfsleeves having a wavelike profile circumferentially, and an elastic pad facing the tape, and a smooth profile facing the pipeline.

The main disadvantage of such sleeve is utilising technical rubber having service life 200 000 hours, that is about 23 years, as elastic pad. Acting Russian norms and specifications for construction, exploitation and repair of main pipelines require that service life of materials used for these purposes is not less than 30 years. Therefore, the structure according to RU2224169 C2, Feb. 20, 2004, can not be considered as means for continuous repair of main pipelines.

According to US 2014048164 A1, Feb. 20, 2014, a method for repairing pipelines is provided, wherein one or more compression straps are installed around the outer circumferential surface of a pipe in the repair zone, corrosion-resistant coating is applied over the installed compression straps and the surface of the pipe in the repair zone, and a composite outer cover is wound around the corrosion-resistant (ground) coating applied in the repair zone.

This method for repairing does not provide a uniform pretension of the whole repair structure and tight squeezing of the pipeline defect area, therefore providing a uniform transfer of the radial load from the defect area to the outer sleeve cover can not be guaranteed, which is a drastic disadvantage of this repair structure.

The prototype for the provided invention is a sleeve (RU 148064 U1, Jul. 14, 2014), which comprises a sleeve mounted on a pipeline consisting of two halfsleeves, made of a cured composite material, and having a cylindrical inner surface corresponding to the pipeline diameter, and a conical outer surface, on the top of which a metallic side wall is mounted, the metallic side wall having a tapered shape, corresponding to the outer surface of the composite sleeve, and consisting of two halves preliminarily connected by means of arc welding. The composite sleeve resists compression and provides full load transfer from the defect area to the metallic side wall.

While the solution disclosed in the prototype for the provided invention lacks two of the most important CST disadvantages (1 and 4) described above, but it still has two disadvantages peculiar for CST, which are:

the complexity of conducting arc welding of the outer metal side wall halves under the water, which constrains application of the given method for repairing underwater pipelines;

the necessity for providing active protection of the metal side wall against soil corrosion.

The provided invention is intended to eliminate the disadvantages, described above.

SUMMARY OF INVENTION

The technical result archived by the provided invention consists in improving performance reliability of the pipeline being repaired by means of a device for repairing pipelines, comprising a sleeve adhered to the pipeline, said sleeve being made of a cured composite material in the form of a truncated cone with a cylindrical passage passing along the axis, the diameter of the passage being equal to the outer diameter of the pipeline being repaired, and a side wall, the inner surface of the side wall corresponding to the outer surface of the sleeve, wherein the side wall is made of a cured composite material.

The composite material, of which the sleeve and the side wall are made, is selected from a group of: fiberglass, carbon fiber reinforced plastic, basalt plastics.

The sleeve is made of a composite material having compression strength equal to at least 70 MPa, which corresponds to JSC "Transneft" requirements for composite materials in the cured condition, used for repairing main oil pipelines in accordance with the composite sleeve technology.

The side wall is made of the composite material having a modulus of elasticity equal to at least 130 GPa, which is at most similar to the value of a modulus of elasticity of pipe steels.

The length of the side wall is less than the length of the sleeve by the value selected depending on the diameter of the pipeline being repaired in the range of 50-200 mm.

In the operating state ends of the sleeve are project with regard to ends of the side wall.

The sleeve and the side wall consist of at least two parts being connected to each other during mounting on the pipeline.

The parts of the side wall comprise hinges on the edges thereof by means of which they are connected to each other, the hinges alternating with grooves for the respective hinges, wherein the hinges are provided with inner bushings, the parts of the side wall are configured to connect to each other by means of coupling shafts fed through the said inner bushings, when the parts of the side wall coincide such that the hinges enter into the respective grooves, wherein the coupling shafts have a smooth cylindrical part, equal to the length of the side wall, having a diameter which does not exceed the inner diameter of the bushings, and a threaded part which, in the operating state, protrudes outside of the side wall not less than by 50-100 mm, the coupling shafts are provided with a stop member at one end and with a screw nut at the other one, screwed with a calibrated force on the threaded part of the shaft through a washer abutted against the abutting end of the sleeve.

The stop member can be implemented as a bolt head with a washer.

Depending on the material, type, operating conditions and service life of the pipeline being repaired inner bushings, coupling shafts, washers and screw nuts are made of metal or composite material selected from a group of: fiberglass, carbon fiber reinforced plastic, basalt plastics.

The inner bushings, the coupling shafts, the washers and the screw nuts, made of metal or a composite material, are used in combination in one repair structure.

BRIEF DESCRIPTION OF DRAWINGS

The invention is described with reference to drawings.

FIG. 1 shows a front view with a cut-out in the region of a defect of the device according to the present invention mounted at the area of the pipeline with the defect;

FIG. 2 shows a side view in section of the device according to the present invention without one of the coupling shafts.

DESCRIPTION OF EMBODIMENTS

A device for repairing pipelines comprises a sleeve 2, mounted on a pipeline 1, with a cylindrical inner surface corresponding to the diameter of the pipeline, and a side wall 3 configured to be mounted with its inner surface on the respective outer surface of the sleeve. The sleeve is made of a cured composite material which resists compression and provides a transfer of a radial load from the defect area to the side wall, which is made of a composite material having a modulus of elasticity with a value similar to that of the steel, i.e. having a bad stretchability. During the manufacturing process cavities 11 in the side wall are filled with a material of which the sleeve is made (for example, fiberglass).

The outer surface of the sleeve 2 and the inner surface of the side wall 3 are formed in the form of a cone. The outer surface of the side wall can be of any shape, in particular, conical. The sleeve 2 (see FIG. 1) consists of at least two component parts being connected to each other during mounting on the pipeline 1 with a defect 4. In the embodiment shown, the sleeve consists of two component parts 2-*a* and 2-*b* (see FIG. 2). When repairing pipelines of big diameter to optimize mounting work, the parts of the repair structure are lightened. To this end the sleeve and the side wall can consist of three and more parts.

The side wall 3 is made of at least two component parts. In the embodiment shown, the side wall consists of two parts 3-*a* and 3-*b* connected to each other by means of shafts 5 with stop members, for example, in the form of a bolt head, arranged at one end of the shafts. The shafts 5 pass through the hinges 9, inside of which the bushings 10 are arranged. The bushings are intended to eliminate gaps between the inner surface of the hinges and the shafts, which can result in generation of bending stresses within the hinges and formation of cracks therein. The stop member is separated from the side wall by a washer 6. The washer 7 and a screw nut 8, put on the other end of the shaft 5, together with the shaft 5, except for the fixing function, act as an arrangement 12 for tightening the side wall on the sleeve and a calibrated squeezing of the repair structure around the defect area of the pipeline. To this end the washer 7 is provided with a reinforced, for example, square shape having rounded corners.

The shafts 5, the washers 6 and 7, as well as the screw nuts 8 and the bushings 10 can be made of metal and/or composite and polymeric materials, particularly depending on conditions and remaining time of the pipeline areas being repaired.

The sleeve 2 has a length longer then a length of the side wall 3 for placing, at the edges of the sleeve, provisional means, for example, compression straps with ratchets and/or strip clamps for pressing and fixing the sleeve during adhesive attaching to the pipeline. With tightening the side wall on the sleeve, compression straps with ratchets and/or strip clamps are removed alternately.

When using the device according to the present invention, repairing the pipeline with the defect is implemented as follows.

At the area of the pipeline 1, having the defect 4, the isolation coating is removed to an extent, which exceeds the length of the sleeve 2. The surface of the pipeline 1 is cleared of residuals of isolation and corrosion. The cavity of the defect 4 is filled with a leveling material, such as Etal plasticine. An adhesive compound, such as Etal 45, is applied on the cleared surface of the pipeline 1 and the sleeve 2 is mounted. The component parts of the sleeve 2 are adhesively attached by side edges during mounting on the pipeline 1. Two parts 2-*a* and 2-*b* of the sleeve are pulled together by any arrangement, such as a compression strap with a ratchet, are fixed at the ends by strip clamps, such as scotch, and then the straps are removed. The component parts 3-*a* and 3-*b* of the side wall are connected by means of shafts 5 through the washers 6 and 7 to form a solid side wall 3, and the screw nuts 8 are screwed on the ends of the shafts 5. Upon that an adhesive compound is applied on the outer surface of the sleeve 2, and the side wall 3 is shifted along the axis of the pipeline 1 on the sleeve 2, such that the washers 7 move beyond the edge of the sleeve 2, and then further tightening the side wall 3 on the sleeve 2 is carried out by means of screwing the screw nuts 8 up to the complete coinciding of the inner surface of the side wall 3 with the outer surface of the sleeve 2 and reaching the value of the tightening rated force of the fixing screw nuts, indicated by a manufacturing company in a specification, formulated for the repair structure being mounted, which depends on a material of the side wall 3 and a type and operating conditions of the pipeline 1 being repaired. The calibrated force for tightening is reached by means of a dynamometric wrench of predefined length. Pulling together component parts of the side wall 3 with a calibrated force is performed for pretension of the assembled repair structure and rated squeezing of the repair area with it in order to provide tight seal and effective transfer of the radial load from the weakened defect area through the sleeve 2 on the composite side wall 3, which is non inferior to the strength characteristics of a defect-free steel pipe, during the whole service life of the pipeline.

Thus, the side wall 3 is fixed on the sleeve 2 by means of the shafts 5 fed through the hinges 9, provided with embedded bushings 10, on the side edges of the component parts of the side wall using stop members 5, washers 6, 7 and crew nuts 8.

Then repaired area is isolated, for example, by means of a heat shrinkable tape overlapping over the old isolation.

Corrosion resistance, high strength characteristics, sealing and dielectric properties of the materials used in this device, the conical outer surface of the sleeve and the inner surface side wall together with the adhesive compound ensure the elimination of gaps between the sleeve and the side wall, and between the pipeline and the sleeve, which increases the performance reliability of the pipeline being repair and bringing it to the level of defect free.

The device for repairing pipelines according to the invention does not require any further arrangements for tightening the side wall on the composite sleeve and protection of the side wall against its crawling from the sleeve while in operation. These functions are performed by the coupling shafts having threading on their ends, with corresponding washers and screw nuts. With tightening with a calibrated force on the outer surface of the cone composite sleeve pre-greased with the adhesive compound, the side wall, assembled of two or more parts, assumes its structural position and transfer resulting radial force to the cone sleeve, which, in turn, being adhesively attached to the defect area of the pipeline, transfers said force to it, thereby pre-tensioning the repair structure and squeezing the pipeline with the force determined by the calculation that together with corrosion resistance, high strength characteristics, sealing and dielectric properties of the materials used in this device, leads repaired area to the state of a defect free pipe for the entire remaining service life of the pipeline.

The invention allows for repairing pipelines either on the ground and underwater. The application of the sleeve according to the invention optimizes time and costs of the repair operations, because welding, as well as lifting and other mechanisms are not required, since both the sleeve and the side wall consist of two or more parts, and are made in workshop conditions of the cured composite materials, which are by many times lighter than the similar parts made of steel. Furthermore, the provided device does not require usage of an active protection against soil corrosion, such as electric connection with the pipeline, cathodic protection station, or protector, which is necessary when using the outer metallic side wall, as in the prototype, or during the composite sleeve repair.

A service life of the composites, used when manufacturing the provided composite cone sleeve, indicated by manufacturing companies is not less than 30 years.

The invention claimed is:

1. A device for repairing pipelines, comprising a sleeve adhered to a pipeline, said sleeve being made of a cured composite material in the form of a truncated cone with a cylindrical passage passing along an axis, the diameter of the passage being equal to the outer diameter of the pipeline being repaired, and a side wall, the inner surface of the side wall corresponding to the outer surface of the sleeve, the side wall is made of a cured composite material, wherein both the sleeve and the side wall consist of at least two parts being connected to each other during mounting on the pipeline, and the parts of the side wall comprise hinges on the edges thereof by means of which they are connected to each other, the hinges alternating with grooves for the respective hinges, wherein the hinges are provided with inner bushings, the parts of the side wall are configured to connect to each other by means of coupling shafts fed through the said inner bushings, when the parts of the side wall coincide such that the hinges enter into the respective grooves, wherein the coupling shafts have a smooth cylindrical part, equal to the length of the side wall, having a diameter which does not exceed the inner diameter of the bushings, and a threaded part which, in the operating state, protrudes outside of the side wall not less than by 50-100 mm, the coupling shafts are provided with a stop member at one end and with a screw nut at the other one, screwed with a calibrated force on the threaded part of the shaft through a washer abutted against an abutting end of the sleeve.

2. The device according to claim 1, wherein the composite material, of which the sleeve and the side wall are made, is selected from a group of: fiberglass, carbon fiber reinforced plastic, basalt plastics.

3. The device according to claim 1, wherein the sleeve is made of the composite material having compression strength equal to at least 70 MPa.

4. The device according to claim 1, wherein the side wall is made of the composite material having a modulus of elasticity equal to at least 130 GPa.

5. The device according to claim 1, wherein the inner bushings, the coupling shafts, the washers and the screw nuts are made of metal or a composite material selected from a group of: fiberglass, carbon fiber reinforced plastic, basalt plastics.

* * * * *